(12) United States Patent
Scott et al.

(10) Patent No.: US 8,521,122 B2
(45) Date of Patent: Aug. 27, 2013

(54) MOBILE DEVICE USER INTERFACE FOR DISPLAYING EMERGENCY INFORMATION

(75) Inventors: Sherryl Lee Lorraine Scott, Waterloo (CA); Earl Friedberg, Waterloo (CA); Jeffery Charles Bos, Waterloo (CA); Leonid Vymenets, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 510 days.

(21) Appl. No.: 12/361,084

(22) Filed: Jan. 28, 2009

(65) Prior Publication Data
US 2010/0190479 A1     Jul. 29, 2010

(51) Int. Cl.
H04M 11/04     (2006.01)

(52) U.S. Cl.
USPC ................................. 455/404.1; 455/404.2

(58) Field of Classification Search
USPC ................................ 455/456.3, 456.1, 404.1
See application file for complete search history.

(56) References Cited

U.S. PATENT DOCUMENTS

| | | | |
|---|---|---|---|
| 5,742,666 | A | 4/1998 | Alpert |
| 5,933,080 | A | 8/1999 | Nojima |
| 6,574,484 | B1 | 6/2003 | Carley |
| 7,466,235 | B1 | 12/2008 | Kolb |
| 2002/0131330 | A1 | 9/2002 | Zion et al. |
| 2003/0076932 | A1 | 4/2003 | Andrew |
| 2003/0104790 | A1 | 6/2003 | Ylitalo |
| 2004/0024706 | A1 | 2/2004 | Leduc |
| 2004/0103000 | A1 | 5/2004 | Owurowa et al. |
| 2004/0203576 | A1 | 10/2004 | Droste et al. |
| 2004/0203622 | A1 | 10/2004 | Esque et al. |
| 2005/0151642 | A1 | 7/2005 | Tupler |
| 2006/0026689 | A1 | 2/2006 | Barker et al. |
| 2006/0079269 | A1 | 4/2006 | Sorotzkin |
| 2006/0142057 | A1 | 6/2006 | Schuler et al. |

(Continued)

FOREIGN PATENT DOCUMENTS

| | | |
|---|---|---|
| CA | 2691345 | 7/2010 |
| DE | 10064978 C1 | 7/2002 |

(Continued)

OTHER PUBLICATIONS

Extended European Search Report dated May 20, 2009 Issued in reference to European Patent Application 09151567.6.

(Continued)

*Primary Examiner* — Tu X Nguyen
(74) *Attorney, Agent, or Firm* — Finnegan Henderson Farabow Garrett & Dunner, LLP

(57) ABSTRACT

A wireless communications device displays emergency information such as, for example, contact information for multiple next of kin or other contact persons as well as personal, medical or travel-specific information about the owner of the device. This emergency information is made accessible on a graphical user interface or display screen of the device to a first responder, paramedic or other person coming to the rescue of the owner of the wireless communications device. Multiple contacts, which may optionally be arranged in order of proximity to the current location of the device, are presented to the first responder so as to provide the first responder with alternate contacts. Where the contacts are dynamically re-prioritized in terms of relative distance to the current location of the device, the emergency contacts that are presented to the first responder have the added advantage of being more geographically relevant and easier to understand based on relevant content being translated to a language appropriate to the current location.

17 Claims, 16 Drawing Sheets

(56) References Cited

U.S. PATENT DOCUMENTS

| | | | |
|---|---|---|---|
| 2006/0172720 | A1 | 8/2006 | Islam et al. |
| 2007/0102527 | A1 | 5/2007 | Eubank |
| 2007/0117574 | A1 | 5/2007 | Watanabe |
| 2007/0135043 | A1 | 6/2007 | Hayes et al. |
| 2007/0243853 | A1 | 10/2007 | Bumiller et al. |
| 2008/0005301 | A1 | 1/2008 | Li et al. |
| 2008/0070546 | A1 | 3/2008 | Lee |
| 2008/0080687 | A1 | 4/2008 | Broms |
| 2008/0166992 | A1 | 7/2008 | Ricordi |
| 2008/0284587 | A1 | 11/2008 | Saigh et al. |
| 2009/0005068 | A1* | 1/2009 | Forstall et al. ............. 455/456.1 |
| 2009/0047923 | A1 | 2/2009 | Jain et al. |
| 2009/0205041 | A1 | 8/2009 | Michalske |
| 2010/0069099 | A1 | 3/2010 | Dunn et al. |
| 2010/0190467 | A1 | 7/2010 | Scott et al. |
| 2011/0041102 | A1 | 2/2011 | Kim |
| 2011/0088003 | A1 | 4/2011 | Swink et al. |

FOREIGN PATENT DOCUMENTS

| | | | |
|---|---|---|---|
| DE | 10323582 A | | 12/2004 |
| EP | 1170969 | | 1/2002 |
| EP | 2214385 | | 8/2010 |
| GB | 2401285 A | | 11/2004 |
| JP | 2004-120467 | | 4/2004 |
| WO | 01/41458 | | 6/2001 |
| WO | 2004051976 A | | 6/2004 |
| WO | 2004054278 A2 | | 6/2004 |
| WO | 2004/082190 | | 9/2004 |
| WO | 2004/104898 | | 12/2004 |
| WO | 2005053337 | | 6/2005 |
| WO | 2005/069676 | | 7/2005 |
| WO | 2006135120 A1 | | 12/2006 |
| WO | 2007118331 A | | 10/2007 |
| WO | 2007118331 A1 | | 10/2007 |

OTHER PUBLICATIONS

Extended European Search Report dated Jun. 7, 2009 Issued in reference to European Patent Application No. 09151568.4.

European Search Report for EP Application No. 09151569.2 dated May 13, 2009.

Advisory Action for U.S. Appl. No. 12/361,116 dated Nov. 14, 2011 (3 pages).

European Search Report for EP Application No. 09151568.4 dated Jun. 7, 2010 (5 pages).

Office Action for U.S. Appl. No. 12/361,052 dated Dec. 1, 2011 (12 pages).

Office Action for U.S. Appl. No. 12/361,052 dated Jun. 30, 2011 (8 pages).

Office Action for U.S. Appl. No. 12/361,116 dated May 17, 2011 (14 pages).

Office Action for U.S. Appl. No. 12/361,116 dated Sep. 27, 2011 (14 pages).

"3rd Generation Partnership Project; Technical Specification Group Services and System Aspects; Man-Machine Interface (MMI) of the User Equipment (UE) (Release 7)," 3GPP TS 22.030 v7.0.1 (Jul. 2005).

"I.C.E. (In Case of Emergency) Initiative [Edited]," Cingular Customer Forums, Aug. 4, 2005, Retrieved from http://forums.cingular.com/cng/board/message?board.id=announcements&message.id=206.

"ICE Your Cell Phone for Safety," CBS News, London, Jul. 26, 2005, CBS Broadcasting, Inc., Retrieved from www.cbsnews.com/stories/2005/07/26/earlyshow/printable711715.shtml.

"ICE," Retrieved from http://www.ci.miramar.fl.us/fire/ice.htm on Mar. 31, 2006.

Chaves, Susan, "ICE First application turns cell phones into lifesavers," The Darien Time, Darien, Connecticut, Mar. 16, 2006, Retrieved from http://www.acorn-online.com/news/publish/article_5358.shtml.

Chinese Office Action (with translation) for Chinese Application No. 200780022704.7 dated Feb. 29, 2012 (15 pages).

Coates, Sam, "ICE Cell Phone Plan Would Help Rescurers; Idea to Designate Next of Kin in Electronic Address Book is Gaining Popularity; [Final Edition]," The Washington Post, Jul. 18, 2005, p. A.06, Washington, D.C.

English-language translation of Korean Office Action that issued on Mar. 25, 2010 from corresponding Korean Patent Application No. 10-2008-7027918.

European Office Action for European Application No. 09163500.3 dated Dec. 12, 2012 (6 pages).

Hallburn, Mark, "Putnam county Debuts ICE Program," Putnamlive.com, Retrieved from the Internet URL:http://web.archive.org/web/20051210102349/http://putnamlive.com/PutnamCountyDebutsICEProgram.html.

Hibbert, David, "Help Out in a Crisis—With ICE," Lockergnome LLC, Jul. 14, 2005, Retrieved from www.channels.lockergnome.com/mobile/archives/20050714_help_out_in_a_crisis_with_ice.phtml.

MacInnes, Alexander, "Safety campaign urges storing contact numbers on cellphones," Herald News, Aug. 3, 2005, North Jersey Media Group (2005), Retrieved from www.northjersey.com.

Meyers, Michelle, "ICE your cell phone," CNET News.com, Jul. 19, 2005, Retrieved from http://news.com.com/2061-10800 3-5795310.html.

Morrison, Michael, "Blackberry in a SnapR," Jul. 1, 2005, SAMS, XP007904690 ISBN: 0-672-32670-1.

U.S. Advisory Action for related U.S. Appl. No. 12/361,052, dated Sep. 10, 2012 (3 pages).

U.S. Office Action for related U.S. Appl. No. 12/361,052, dated Apr. 25, 2012 (8 pages).

U.S. Office Action for related U.S. Appl. No. 12/361,052, dated Jul. 3, 2012 (9 pages).

U.S. Office Action for related U.S. Appl. No. 12/361,116, dated Dec. 20, 2012 (15 pages).

U.S. Office Action for related U.S. Appl. No. 13/551,386, dated Dec. 10, 2012 (14 pages).

U.S. Office Action for related U.S. Appl. No. 13/616,297, dated Nov. 15, 2012 (11 pages).

Zatz, Arline, "Star of Life," Rescue-EMS Magazine, Jul./Aug. 1992, Retrieved from www.angelfire.com/co/fantasyfigures/staroflife.html.

* cited by examiner

MOBILE DEVICE USER INTERFACE FOR DISPLAYING EMERGENCY INFORMATION

CROSS-REFERENCE TO RELATED APPLICATIONS

This is the first application filed for the present technology.

TECHNICAL FIELD

The present technology relates generally to mobile devices and, in particular, to the presentation of emergency information on mobile device user interfaces.

BACKGROUND

Wireless communications devices (e.g. cell phones, smart phones, personal digital assistants, wireless-enabled tablets, or other types of mobile communication devices) are becoming ubiquitous. These wireless communications devices enable users to communicate (e.g. by voice, e-mail, text messages), to browse the Web, to calendar events, to store an address book of contacts, and to perform myriad other tasks.

Wireless communications devices can also be used to store personal information about the owner of the device, such as the name and alternate phone number of the owner in case the device is lost. In other instances, wireless communications devices have been used to store emergency information, sometimes referred to as In Case of Emergency ("ICE") information. For example, a device may store be used to identify a contact in the user's address book as an emergency contact person. One approach for doing so is to identify the contact with the acronym "ICE" prior the entry. So, for example, a contact John Smith would be listed as ICE—Smith, John in the address book to signify that John Smith is an emergency contact person for the owner of the device. The main problem with this approach is that it is not universally accepted and many first responders would not necessarily know what "ICE" or any other such designation means. A greater problem, however, is that the address book is typically only accessible by a user who has the password to the device. Thus, without knowledge of the password, the first responder cannot gain access to the emergency information stored within the device. Furthermore, since the way to access an address book varies from device to device, it may not be immediately apparent to the first responder how to quickly check the address book for emergency contacts.

One solution to this problem is provided by Warden Security. A login screen with a password prompt briefly presents a small amount of emergency information such as the name of a contact person to be called in case of emergency, the relationship of the contact person to the owner of the device, and some rudimentary health-related information (such as the owner's blood type). However, since only a very limited amount of emergency information is made available to the first responder, the usefulness of this prior-art technology is minimal. Improvements on this technology would thus be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

In general, the present technology makes accessible a full range of emergency contact information to enable a first responder to properly and efficiently aid the owner of the device. A plurality of contact persons (e.g. a main contact person and at least one alternate contact person) are presented on the display screen of the wireless communications device without requiring the first responder to have knowledge of the password. Interface elements, e.g. links or buttons, are provided to enable the first responder to immediately initiate communication with at least one of the contact persons. In one main implementation, the contact persons are dynamically re-prioritized based on their proximity to the current location of the device. In another implementation, the contact persons can be dynamically re-prioritized based on their availability as determined by consulting a calendar for each contact or by periodically polling a shared-calendar server. In addition to contact persons, the emergency information screen can optionally contain detailed personal information about the owner, detailed medical information about the owner, and/or detailed travel-specific information if the owner is traveling.

Thus, a main aspect of the present technology is a method of presenting emergency information on a display of a wireless communications device. The method entails prioritizing emergency contacts based on a predetermined criterion (e.g. location and/or time and/or stated availability) and then displaying contact information for a plurality of prioritized emergency contacts that have been prioritized based on the predetermined criterion. The method optionally includes providing or displaying an interface element to initiate communication with at least one of the plurality of emergency contacts displayed on the display of the wireless communications device.

Another main aspect of the present technology is a computer program product comprising code which when loaded into memory and executed on a processor of a computing device is adapted to perform the steps of the preceding method.

Yet another main aspect of the present technology is a wireless communications device having a processor operatively coupled to a memory for receiving and storing emergency information and a display operatively coupled to the memory and processor for displaying contact information for a plurality of prioritized emergency contacts that have been prioritized based on a predetermined criterion and for optionally also displaying interface elements to initiate communication with at least one of the plurality of emergency contacts displayed on the display of the wireless communications device.

The details and particulars of these aspects of the technology will now be described below, by way of example, with reference to the attached drawings.

Figure 1:
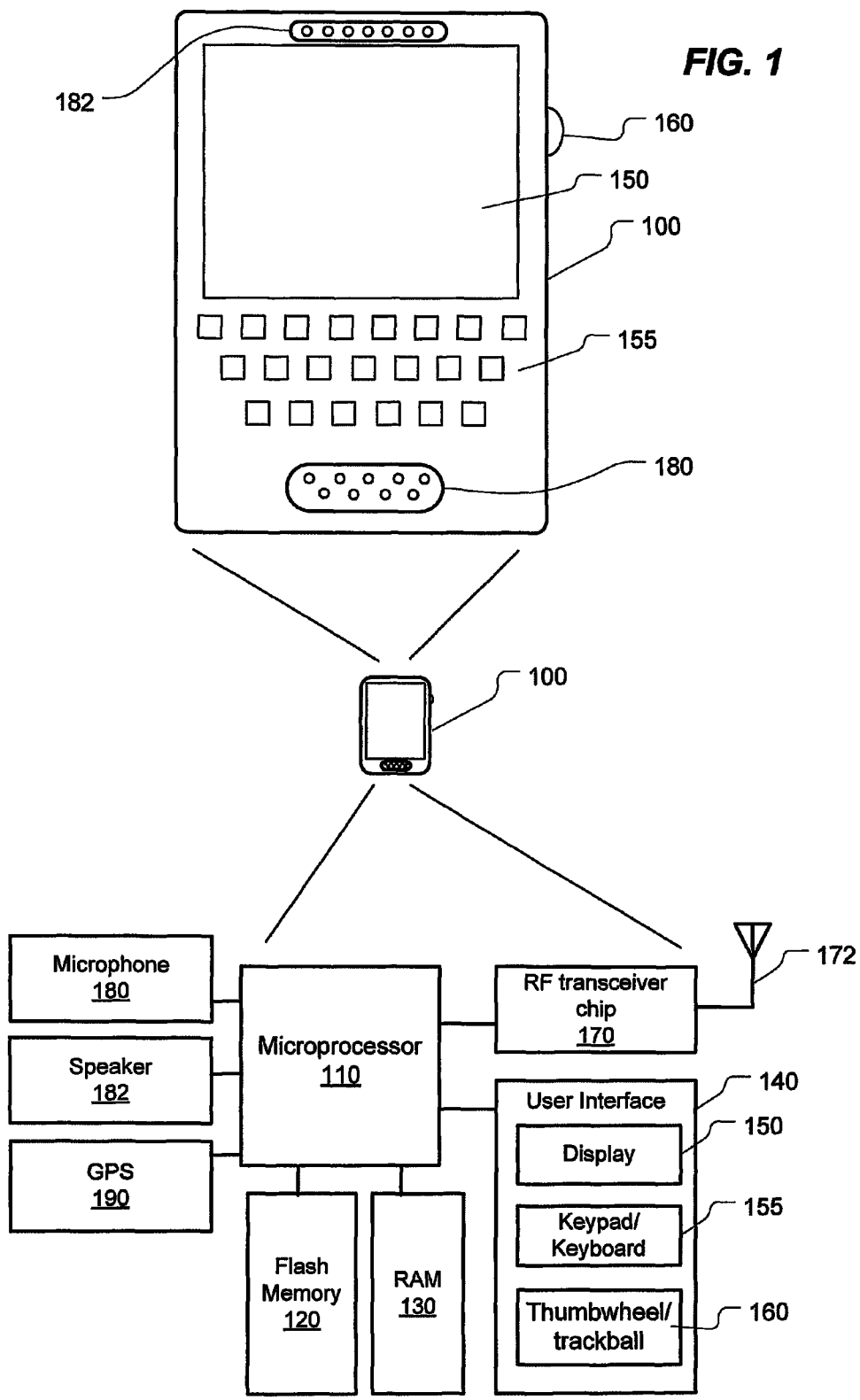
FIG. 1 is a schematic depiction of a wireless communications device in which the present technology can be implemented.

FIG. 1 depicts schematically a wireless communications device 100 on which the present technology can be implemented. For the purposes of this specification, the expression "wireless communications device" is meant to encompass a broad range of electronic communication devices that have processors and memory and which are capable of wireless ("over-the-air") communication. Accordingly, "wireless communications device" is meant to encompass wireless-enabled laptops, tablet PCs, portable, handheld or mobile electronic devices such as smart phones, cell phones, satellite phones, and wireless-enabled PDA's, etc., or any hybrid or multifunction device that has an RF transceiver.

Referring to FIG. 1, each wireless communications device 100 includes a microprocessor 110 or central processing unit (or simply a "processor") and a memory for storing data. The memory may include both a Flash memory 120 and a random access memory (RAM) 130. Each wireless communications device 100 also has a user interface 140 that includes a display (graphical user interface—GUI) 150, e.g. a LCD screen, a keyboard/keypad 155 and an optional thumbwheel/trackball 160. Each wireless communications device 100 includes an RF transceiver chip 170 for wireless communications, i.e. receiving and transmitting both voice and data. For voice communications, the wireless communications device 100 has a microphone 180 and a speaker 182. In addition, the wireless communications device 100 may include a Global Positioning System (GPS) chipset for obtaining position fixes from orbiting GPS satellites.

Figure 2A:
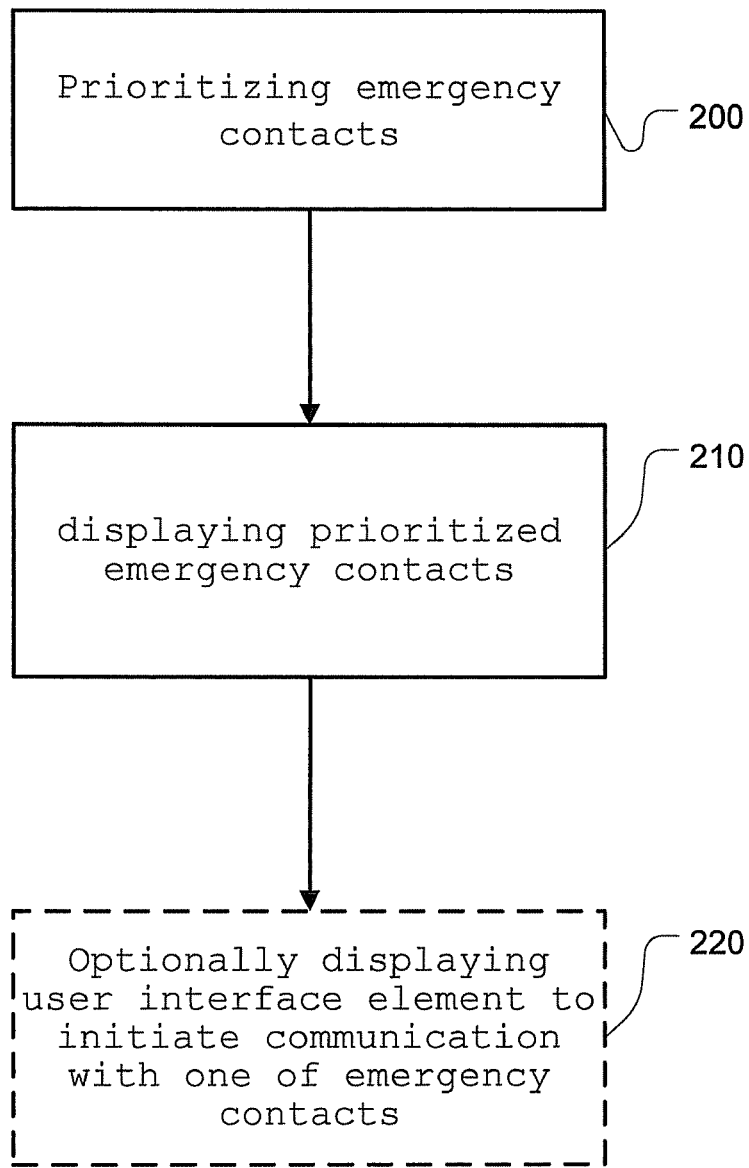
FIG. 2A is a flowchart outlining some of the main steps of a method of displaying emergency information on a user interface of a wireless communications device in accordance with one or more implementations of the present technology.

FIG. 2A is a flowchart outlining some of the main steps of a novel method of displaying emergency information on a user interface of a wireless communications device in accordance with one or more implementations of the present technology. As depicted in FIG. 2A, this novel method entails prioritizing emergency contacts (step 200) based on a predetermined criterion (e.g. location, availability, etc.) and then displaying the prioritized emergency contacts (step 210). Optionally, the method may further involve providing, or presenting a user interface element to initiate communication with one of the emergency contacts (optional step 220).

Figure 2B:
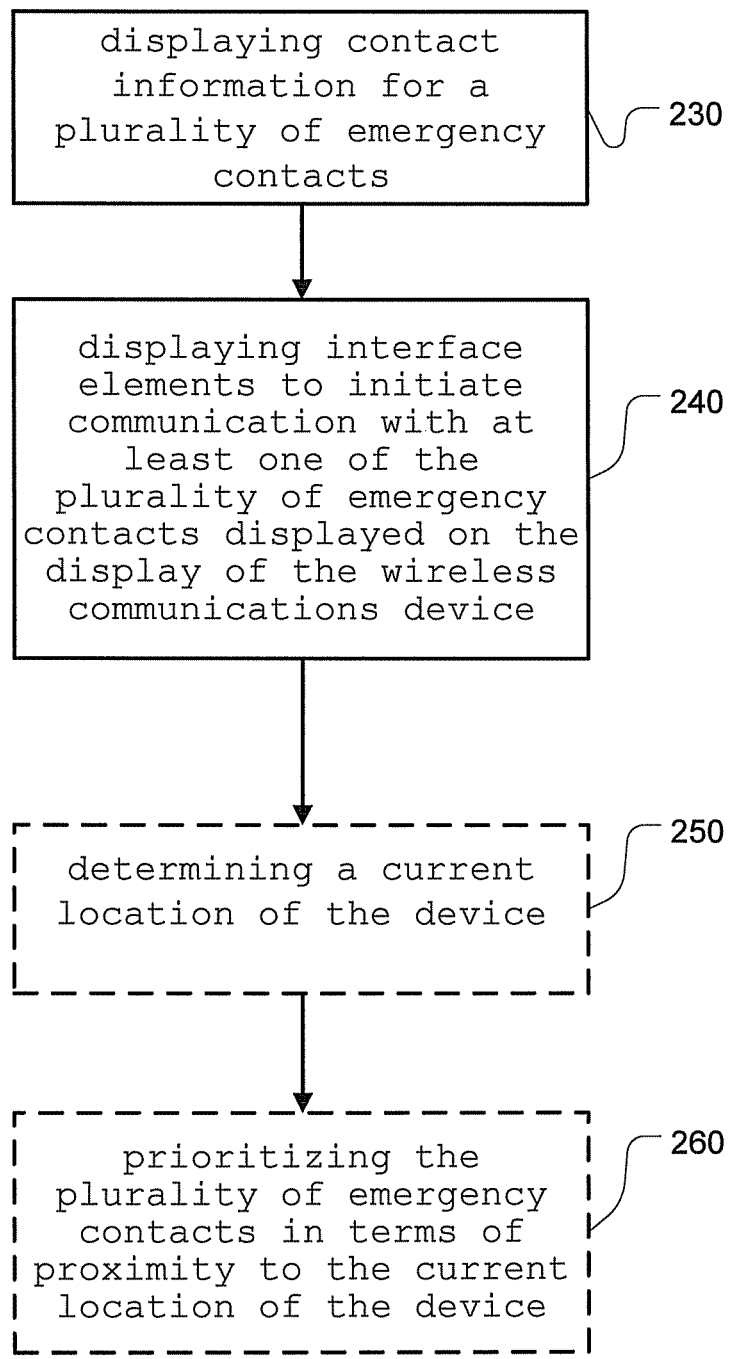
FIG. 2B is a flowchart outlining some of the main steps of a related method of displaying emergency information on a user interface of a wireless communications device in accordance with one or more implementations of the present technology.

FIG. 2B is a flowchart outlining some of the main steps of a related method of displaying emergency information on a user interface of a wireless communications device in accordance with one or more implementations of the present technology. As depicted in FIG. 2B, this novel method of presenting emergency information on a display of a wireless communications device entails (at step 230) displaying contact information for a plurality of emergency contacts and (at step 240) displaying interface elements to initiate communication with at least one of the plurality of emergency contacts displayed on the display of the wireless communications device.

In one main implementation of the technology, the method further entails (at step 250) determining a current location of the device and (at step 260) prioritizing the plurality of emergency contacts in terms of proximity to the current location of the device. As steps 250 and 260 are optional steps, these are shown in dashed lines in FIG. 2. In other words, the device may re-order the emergency contacts based on the current location of the device. The current location of the device can be determined using the GPS receiver 190 or by any other suitable location-determining means such as radiolocation techniques.

The novel method may further involve displaying or providing access to a variety of other useful emergency-related information that might be used by the first responder in case of an emergency. For example, as will be elaborated below, this emergency information may include owner information comprising personal information about an owner of the device, medical information about the owner, next-of-kin information (optionally prioritized in terms of proximity to the current location of the device), and/or travel-specific information, wherein the travel-specific information is optionally dynamically updated by the device based on the current location of the device. For the purposes of this specification, the term "owner" is meant to include not just the proprietor of the device but also the main user of the device.

The innovative features of the present invention will be described in greater detail below. However, before delving into these details, it is important to note that the emergency information is presented such that it is made accessible to a first responder without any knowledge of the password or login. In other words, while access to an address book or other data on the device usually requires inputting a password at a password prompt on a login screen, this emergency information is accessible from the login screen (or "main screen"). The information can be presented wholly or partially on the login screen (main screen) or a link, button or other user interface element can be provided to enable the first responder to access this information (thus bypassing the login or password prompt). For the purposes of this specification, the expression "first responder" includes not only a paramedic, doctor, nurse, emergency room worker, ambulance driver, emergency medical technician, etc., but also any other person who comes to the rescue of the owner of the wireless communications device in the event of an emergency.

Figure 3:
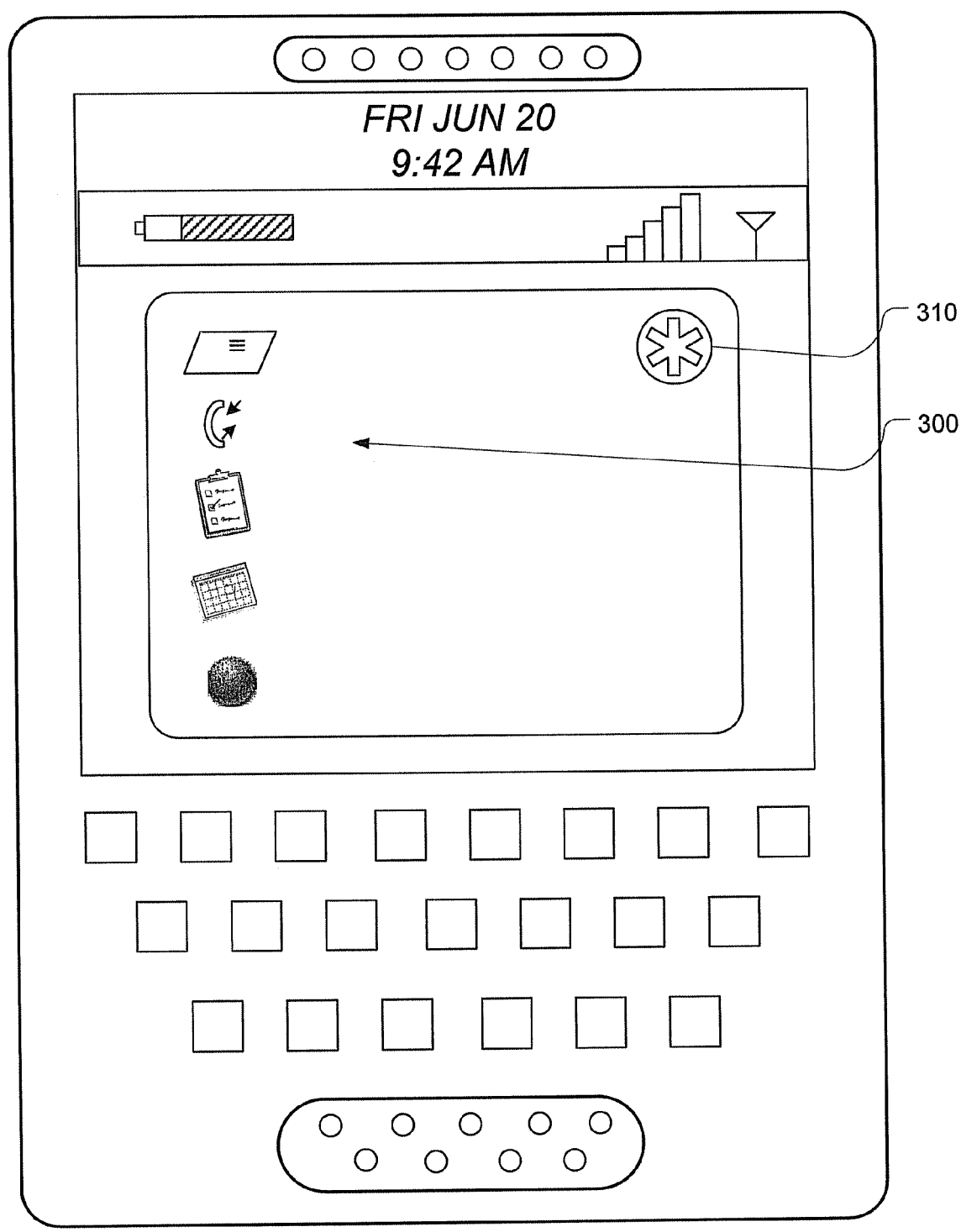
FIG. 3 schematically depicts a wireless communications device displaying, by way of example, a home screen icon view on which a universally recognizable emergency information icon is presented.

FIG. 3 schematically depicts a wireless communications device displaying, by way of example, a home screen icon view 300 on which a universally recognizable emergency information icon 310 is presented. As shown in this example, the Blue Star of Life (also known simply as the Star of Life) can be used since this is a generally recognizable emergency medical care symbol. The Star of Life is a six-barred cross, as shown in the figure. A different graphical indicator (e.g. another symbol, logo, word, letter, or abbreviation) could be used in lieu of the Star of Life to indicate that emergency information is available for the first responder.

The Star of Life icon 310 is presented on the home screen icon view 300 in FIG. 3 for two purposes. The first and main purpose is for the owner or main user to enter or input emergency information via the various screens of the "In Case of Emergency" application (ICE application). The user can use the ICE application to add emergency information, edit it, update it, delete it, etc. In other words, the icon 310 provides a shortcut on the home screen icon view to the ICE application to thereby enable the user/owner to easily enter and manage emergency information about himself or herself. The second purpose is to provide access to the emergency information for the first responder in two scenarios: (i) where the user/owner has just recently logged into the device, e.g. by entering his/her password just prior to the accident, and the device has not yet timed out, in which case the first responder will see the home screen icon view (instead of the login screen) and can thus immediately access the ICE application and the information contained therein by clicking the icon 310; and (ii) where the user/owner is in distress but still able to give the password to the first responder. For example, the owner may be in distress, immobilized or otherwise injured but still conscious and able to utter the password to the first responder. The first responder could then access the device and click on the icon 310 to view all of the emergency information by consulting the various fields or screens of the ICE application.

Figure 4:
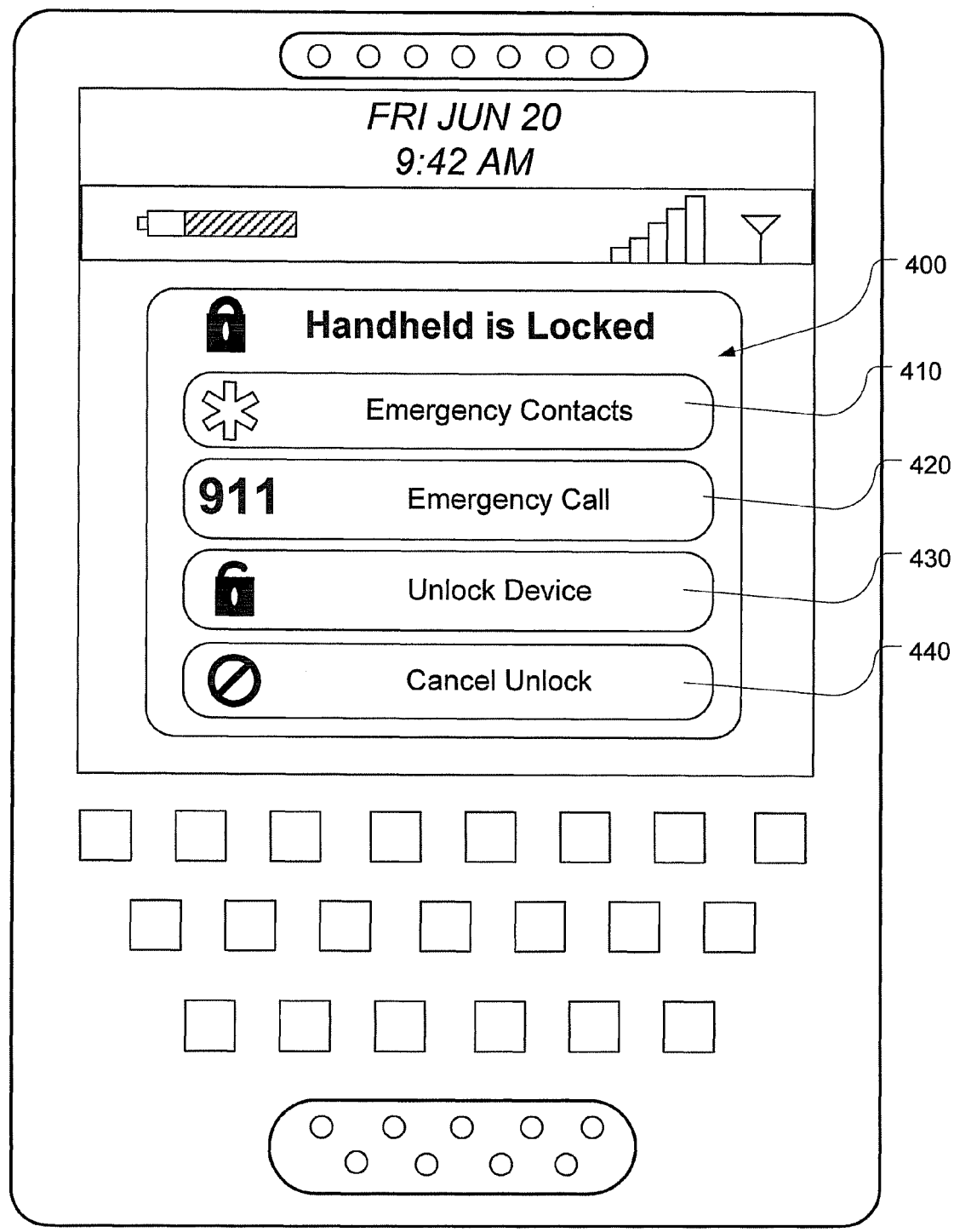
FIG. 4 schematically depicts a wireless communications device displaying, by way of example, a login screen that presents interface elements for accessing emergency contacts, to place an emergency call, or to unlock the device by entering a password.

FIG. 4 schematically depicts a wireless communications device displaying, by way of example, a login screen 400 that presents interface elements 410-440 for accessing emergency contacts, to place an emergency call, or to unlock the device by entering a password. As depicted in FIG. 4, the login screen 400 has a user interface element 410 for accessing and contacting Emergency Contacts, a user interface elements 420 for making an Emergency Call (e.g. dialling 911), a user interface elements 430 for unlocking the device (which leads to a password prompt or biometric input, etc.), and a user interface element 440 to cancel the unlocking of the device. As will be appreciated, the user interface element 410 for Emergency Contacts could be replaced with one that reads more generically "Emergency Information". Whatever the label, the user interface element (e.g. a button, link, hot key, keypad sequence, etc.) provides access to emergency information without requiring that the password be entered. Thus, a first responder can pick up the owner's wireless device and from the login screen click on the Emergency Contacts button 410 in order to get a list of people to contact in case of emergency as well as other emergency information about the owner of the device.

This novel technology therefore enables the usual lockout/password screen to be bypassed by a first responder so that the first responder can access ICE information stored in a memory of the device or on a SIM card inserted into the device. While the device normally requires a password or other login credentials to access information on the device, the ICE information is made accessible to any first responder while protecting the privacy of all other information on the device. Non-ICE information, e.g. personal address book, e-mails, etc. is kept private assuming the device was locked when ICE information is first accessed. In other words, there is separation of the device-locking and the ICE-access functions, so that access to ICE does not compromise the basic device security and/or compromise SIM security.

Man-machine user interface events may be designated to unlock ICE information to thus bypass the normal login requirement. For example, pressing a "*" key (asterisk or 'star of life') three or four times, or holding a "*" key (asterisk or 'start of life') for two seconds. Advantageously, the asterisk has some similar characteristics as the 'star of life', and is common to many keyboards; the asterisk is a required key according to 3GPP specification. Pressing four times is a preferred implementation since pressing three times could be used for supplementary service codes according to the 3GPP specifications. To provide an increased ease of use, when the device is a cell phone and is in the locked state or idle state (and not accepting supplementary service codes), three "*" (asterisks) or 'star of life' presses also opens the device to the ICE information: such shortened code does not interfere with the potential use of three asterisks for supplementary service codes since these codes can only be entered when the cell phone is in an unlocked state. As some devices do not have a keypad, there may not be the "*" key available. Examples of such devices include MP3 players and other portable music devices, and cell phones for children that do not have a cell phone keypad but use a specially-adapted user interface. Such devices typically have some form of man-machine interface that allows access to menus. In those cases ICE information can be positioned as a menu item.

Figure 5:
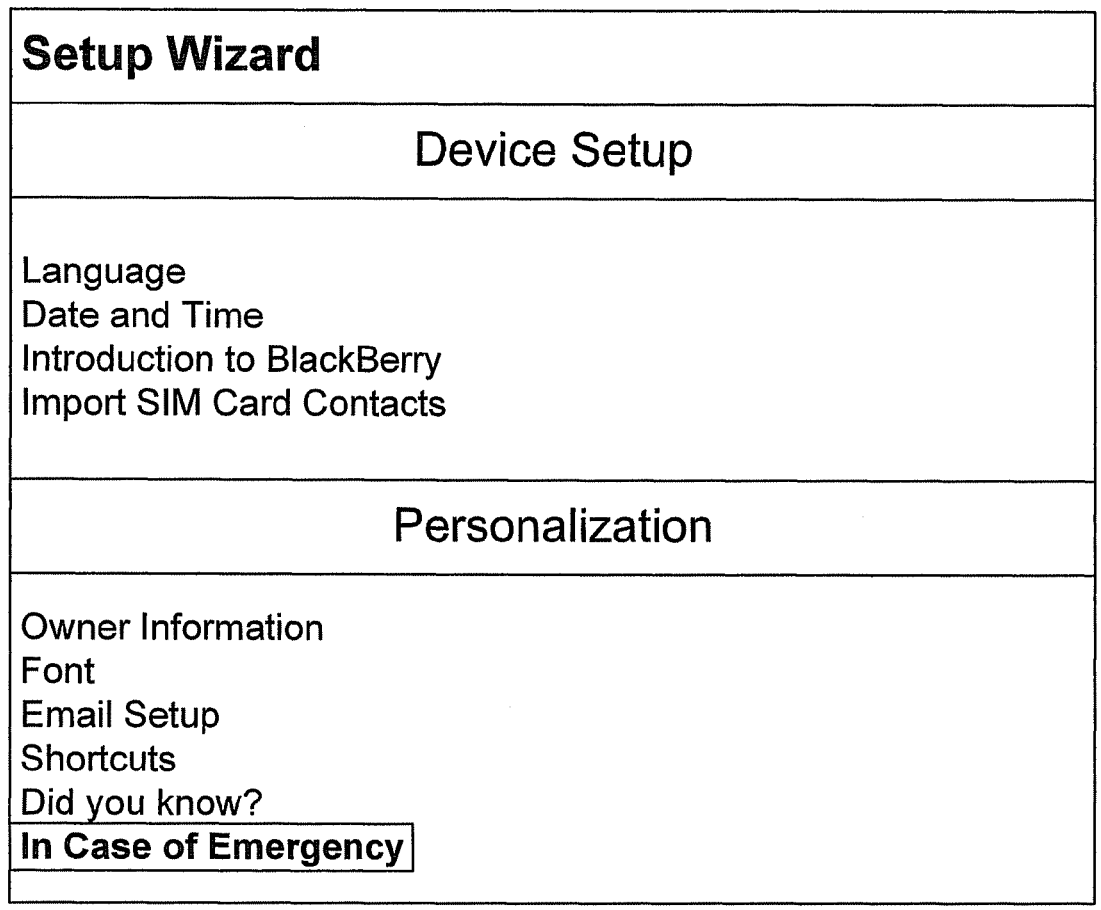
FIG. 5 schematically depicts an example of a setup wizard for inputting emergency information.

FIG. 5 schematically depicts an example of a setup wizard 500 for inputting emergency information. This setup wizard can be used to facilitate the task of setting up the In Case of Emergency (ICE) information on the device. Optionally, the setup of the device can be configured such that the user is prompted to enter ICE information when the device is first set up. A simple setup wizard leads the user/owner through various screens to ensure that all important personal information and medical information is inputted. The device may optionally only present the Emergency Contacts button 410 shown in FIG. 4 if the ICE information has been entered. If no information has been entered, the login screen shown in FIG. 4 can show the Emergency Contacts greyed out or simply absent from the screen. This will preclude the first responder from wasting precious time searching in the device for ICE information if no such information has been entered.

Figure 6:
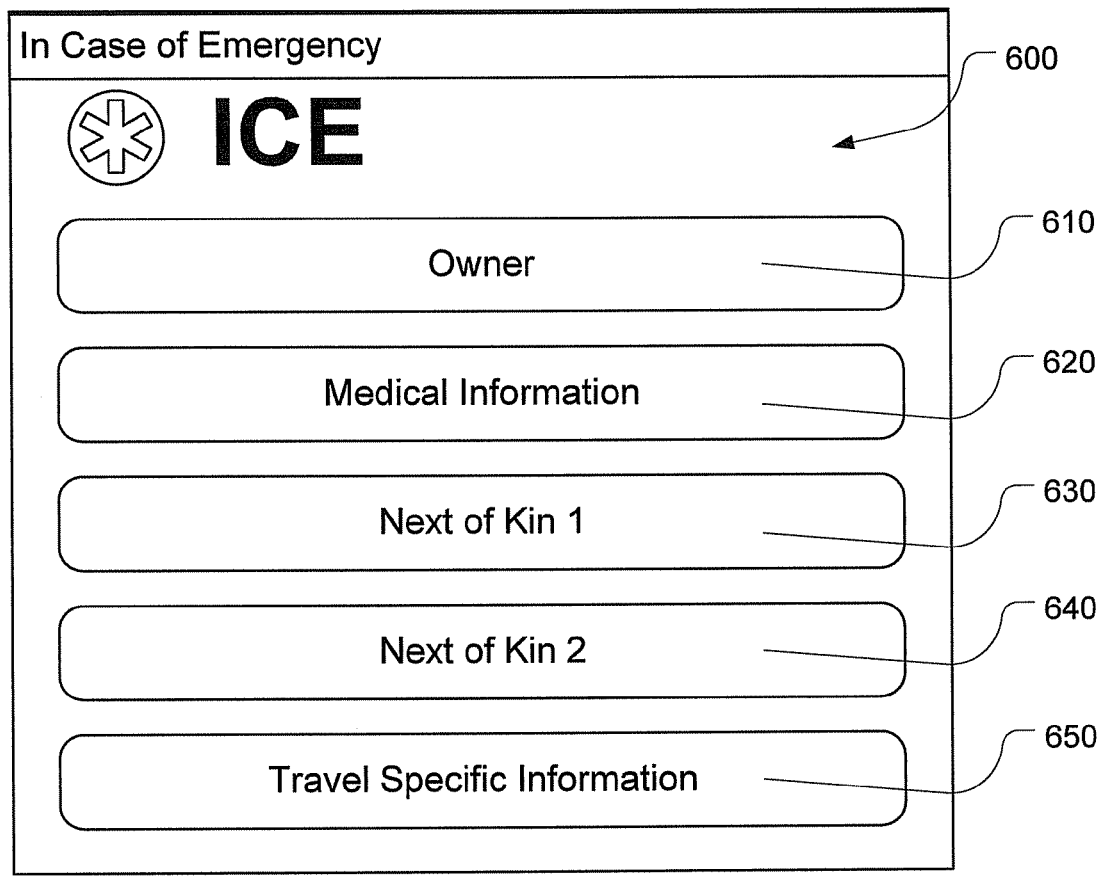
FIG. 6 is a schematic depiction of an example of a main emergency information setup screen presenting interface elements to enable the owner to fill out various categories of emergency information including owner information, medical information, next-of-kin information and travel-specific information.

Once the user or owner of the device launches the setup wizard shown by way of example in FIG. 5, the owner/user is then led to the main ICE setup screen shown by way of example in FIG. 6. The main ICE setup screen may provide a set of choices or categories as shown in FIG. 6 for filling out relevant pieces of emergency-related information. These categories of emergency-related information may include, for example, owner information, medical information, next-of-kin information and travel-specific information.

Figure 7:
FIG. 7 is a schematic depiction of an example of an owner information screen that enables the user to fill out personal information about the owner of the device.

For example, the main emergency information setup screen 600 shown in FIG. 6 presents a user interface element 610 to enable the owner to access an owner information screen 700 shown by way of example in FIG. 7. The owner information screen shown in FIG. 7 has a plurality of fields that can be filled out to provide all the various pieces of owner information such as, for example, first name, last name, work number, home number, mobile number, pager number, fax number, other number(s), PIN number, home address (street, city, state/province, ZIP/postal code, country), webpage, and other notes.

Figure 8:
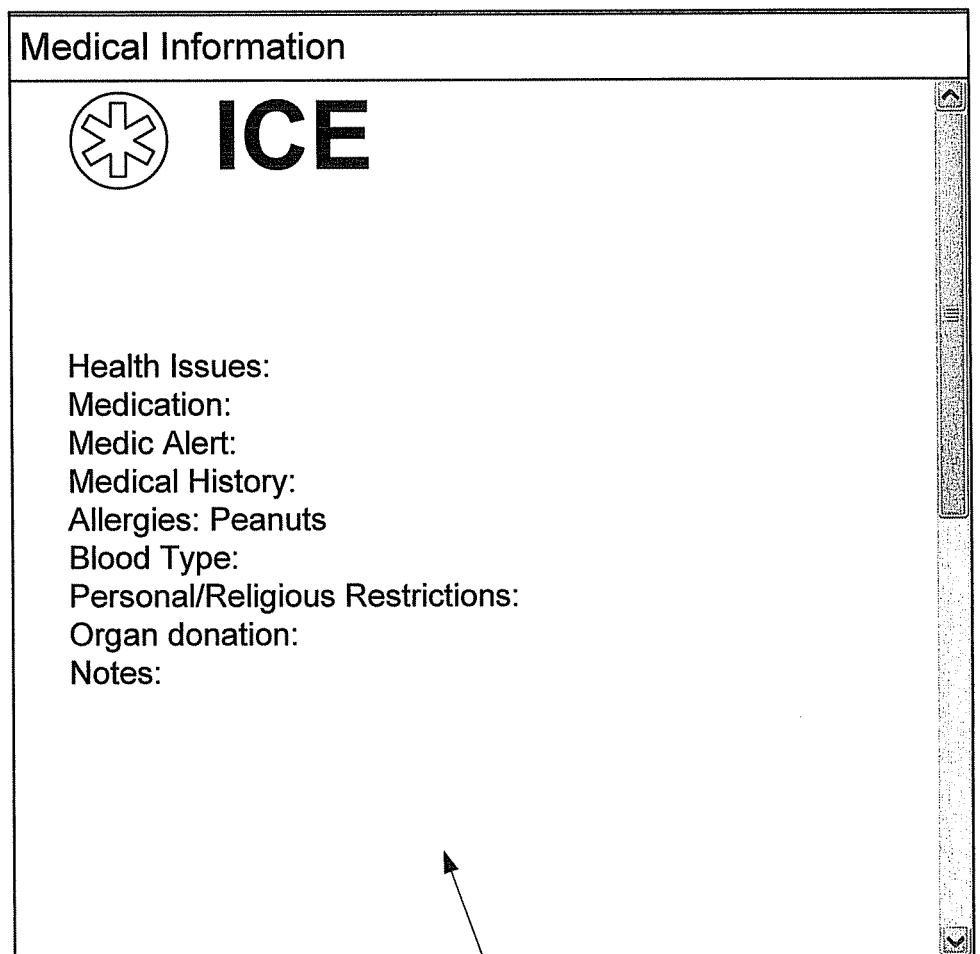
FIG. 8 is a schematic depiction of an example of a medical information screen that enables the user to fill out medical information about the owner of the device.

As further depicted in FIG. 6, the main emergency information setup screen 600 also presents a user interface element 620 to enable the owner to access a medical information screen 800 shown by way of example in FIG. 8 that has a plurality of fields that can be filled out with medical information. As shown in FIG. 8, the medical information may include fields for health issues, medication, medic alert, medical history, allergies, blood type, personal/religious restrictions, organ donation and other notes.

Figure 9:
FIG. 9 is a schematic depiction of an example of a next-of-kin information screen that enables the user to fill out information about the owner's first next-of-kin.
Figure 10:
FIG. 10 is a schematic depiction of an example of another next-of-kin information screen that enables the user to fill out information about the owner's second next-of-kin.

The main emergency information setup screen 600 also presents a user interface element 630 to enable the owner to access a screen 900 for setting up first next-of-kin information such as the example screen depicted in FIG. 9. The information for the first next of kin may include the next-of-kin's first name, last name, work number, home number, mobile number, pager number, fax number, other number(s), PIN number, home address (street, city, state/province, ZIP/postal code, country), webpage, and other notes. Similarly, a user interface element 640 on screen 600 provides access to a screen 1000 for filling out a second next-of-kin's information. As shown in FIG. 10, the information fields for the second next of kin are identical to those for the first next of kin, although this is not necessarily the case. It should also be understood that the emergency contact person need not be a next of kin in the traditional sense (i.e. a family member or blood relative). The first and second next of kin information screens can optionally be renamed as first and second contact persons (or any other more generic label) in a variant of this implementation.

Figure 11:
FIG. 11 is a schematic depiction of an example of a travel-specific information screen that enables the user to enter travel-specific information.

As depicted in FIG. 6, the main ICE setup screen 600 also presents a user interface element 650 to enable the owner to access a screen 1100 for inputting travel-specific information, e.g. prior to embarking on a trip. An example of such a screen is shown in FIG. 11. Fields are provided for the name of the tour company, the tour guide, his or her mobile number, work number, e-mail address, travel dates, travel itinerary, consulate/embassy contact information. A further time-dependent and/or location-dependent trigger may be added to ensure that the travel-specific information is only presented if the GPS chipset provides a location reading that concords with the itinerary and if the time and date correspond to the travel dates. When the trip is over, the user can manually delete the travel-specific information. Alternatively, the device can automatically delete its travel-specific information by intelligently observing that the date and time and/or GPS position fix no longer concord with the travel dates and/or travel destinations. A further feature may be provided to enable a user to specify that travel-specific information is to be retained. This is useful, for example, in the case where a device owner travels frequently to the same destination. For example, if the device owner travels frequently to a certain city, the travel-specific information about that city (preferred contacts in that city, preferred hospital in that city, etc.) can be retained in the device.

In a variant, in addition to any travel-specific information, the wireless device can store location-dependent emergency information. Location-dependent emergency information provides emergency information based on the current location of the device. For example, a user who spends a substantial amount of time in two or three different cities may wish to specify emergency information for each of the different cities. When in City A, the emergency contact persons may be persons A1 and A2 whereas in City B his contacts are persons B1 and B2. Similarly, the emergency contact information may specify one hospital for City A and a different hospital for City B. The device can use a location-determining subsystem (e.g. GPS positioning or even a coarser technique like cell tower ID) to determine which city the user is presently in. The device would then automatically switch the emergency contact information based on the current location of the device. In other words, location-dependent emergency information can be dynamically updated to ensure that the most geographically relevant emergency information is presented to a first responder.

In another variant, the location-dependent emergency information may be presented in different languages depending on the current location of the device. In other words, the language used to present the emergency information can be dynamically updated based on the current location of the device. The device can use GPS, radiolocation, cell tower ID or any other location-determining means to determine its current location. The device can then compare its location to a geographical information database to determine the language spoken by the local population in the country, region or city corresponding to the current location of the device. The device can then automatically translate at least some of the emergency information into a language appropriate for the current location, e.g. the local language of the country or region. For example, if the device detects that it is in Italy, then the device in this particular implementation will translate the stored emergency information into Italian so that a first responder will be able to fully comprehend the emergency information stored in the device. In one implementation, contact names would stay the same (remain in their native, default language) but the field labels used to describe the contacts would be automatically translated. Appropriate country codes or international dialling prefixes could be added automatically. In some cases, the current location may correspond to more than one local language. In those cases, a "change language" option can be presented onscreen to enable the first responder to switch to a more familiar language if desired.

As will be appreciated, with regard to FIGS. 6 to 11, the various names and labels of the buttons, the order of the user interface elements, their layout onscreen, the various fields of information and other visual aspects of the main emergency information setup screen 600 or of the other screens 700-1100 can, of course, be varied or modified. Furthermore, the main emergency information screen 600 may include additional categories of information or, alternatively, it may contain only a subset of the categories of information presented in the example screen shown in FIG. 6. Likewise, additional or fewer fields can be provided for each of the various screens 700, 800, 900, 1000, and 1100.

In use, assuming the wireless communications device is locked out when the first responder arrives on the scene, the first responder will realize that the person in distress is the owner of an ICE-equipped wireless communications device. The first responder will recognize that the device contains ICE information either due to an external sticker on the case of the device or by virtue of a watermark or icon showing on the main login screen. The first responder clicks on the "Emergency Contacts" (or "Emergency Information") button 410 of the login screen as shown back in FIG. 4. This button 410 is linked to the ICE information screen 1200 presented by way of example in FIG. 12 and FIG. 13. The ICE information screen 1200 shown by way of example in FIG. 6 presents a succinct summary of the key emergency information entered into the device. The Star of Life or other icon may be depicted on this screen to provide immediate visual confirmation to the first responder that he or she has arrived at the correct screen.

Figure 12:
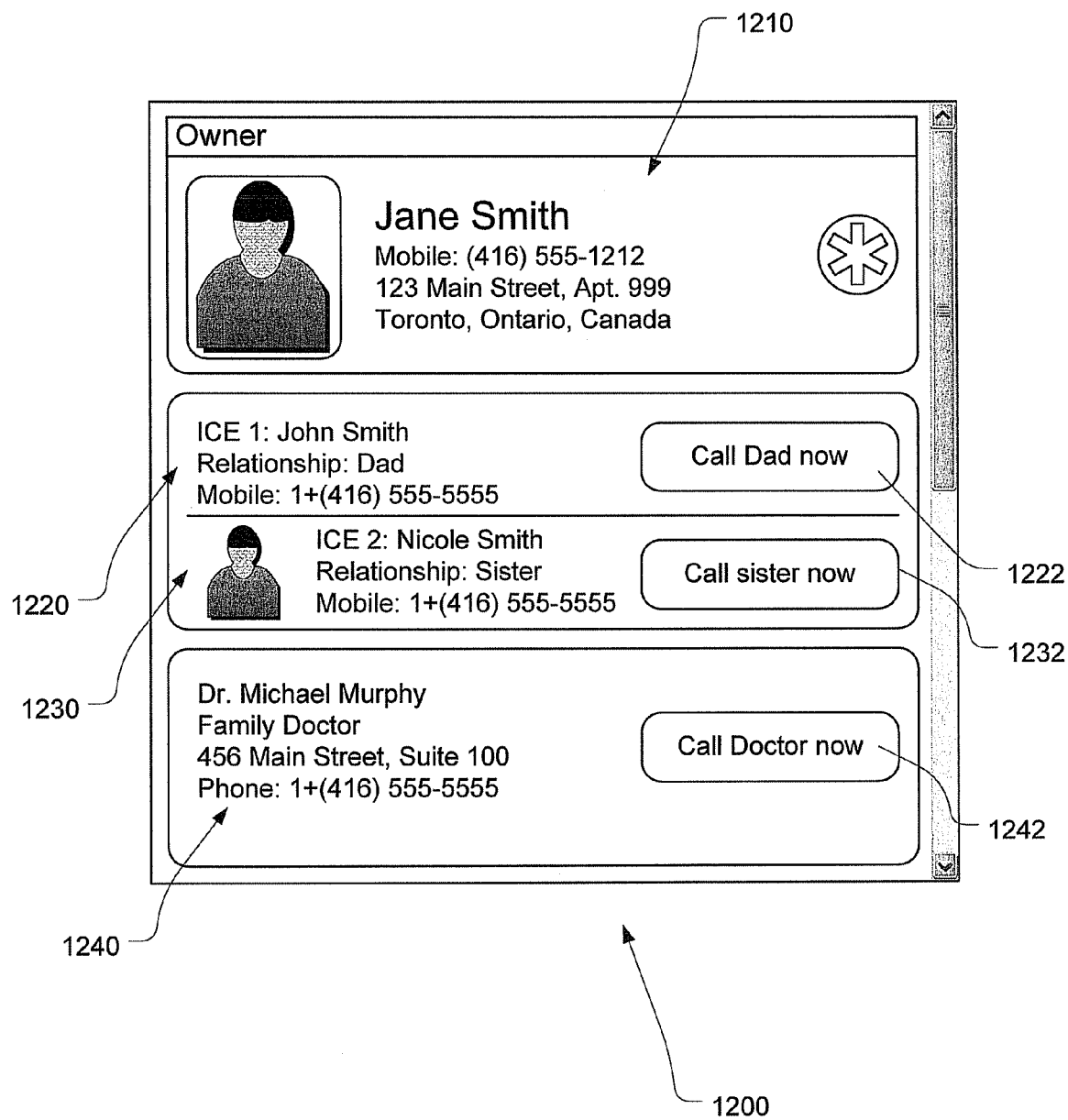
FIG. 12 schematically depicts, by way of example, an emergency information screen (or an "In Case of Emergency" Screen) showing owner information and emergency contacts.

As shown in FIG. 12, some key owner information 1210 is presented to help identify the person in distress, i.e. the owner or user of the device. A photograph may be included to help identify the person distress. During setup, the device (if equipped with a digital camera) may instruct the owner how to take a self-portrait for the purposes of incorporating a digital photograph into the owner information portion of the ICE screen 1200. In addition, the owner's name, mobile number, address or other information can be provided to further help identify the owner.

As further shown in FIG. 12, The emergency information includes at least two contact persons (ICE 1 designated by 1220 and ICE 2 designated by 1230), i.e. a main contact and at least one alternate contact. Although only two contacts 1220, 1230 are shown in the figure, it should be appreciated that the device may display three or more contacts. The relationship between the owner and each of the contacts can be provided as well (e.g. "Dad" or "Sister"). A user interface element "Call Dad now" 1222 is presented to enable the first responder to speed dial the owner's father. A second user interface element "Call sister now" 1232 enables the first responder to speed dial the owner's sister as an alternate contact.

Optionally, as mentioned above, these contacts can be ordered or prioritized in terms of their proximity to the current location of the device (or they can be manually ordered, if desired). These contacts may also be prioritized in terms of their availability. Their availability can be determined based on a shared calendar, based on calendar information exchanged between next of kin and owner, or by any other means. For example, as part of a data synchronization/reconciliation process, a wireless communications device may obtain shared calendar information from other persons on a periodic basis, thus enabling the device to dynamically re-prioritize the order of the emergency contacts based on their availability. In a more refined variant, the device could take into account both the proximity to the current location and the stated availability. In yet a further variant, the user of the device can specify for each emergency contact a time of day when that contact is likely to be responsive. For example, a certain next of kin may be known to go to bed early every night. Thus, if an accident occurs after that contact's bedtime, then the device should not present that contact as the main contact. Similarly, a contact may be unavailable to respond to an emergency during work hours (e.g. an airline pilot). The availability times of each contact person can thus also be manually input by the owner when setting up the ICE application. From the foregoing, it should be apparent that the prioritizing of emergency contacts can be based on a predetermined criterion such as, for example, the current or default location of each emergency contact or the availability of each emergency contact at that particular time.

In addition to the owner information and the information about the contact persons/next of kin (labelled as ICE 1 and ICE 2 in FIG. 12), the ICE Information Screen 1200 may provide 1210 doctor information 1240 and a speed dial button (or other user interface element) 1242 to initiate a voice communication with the listed doctor (or his pager or his office, hospital, clinic, etc.).

Figure 13:
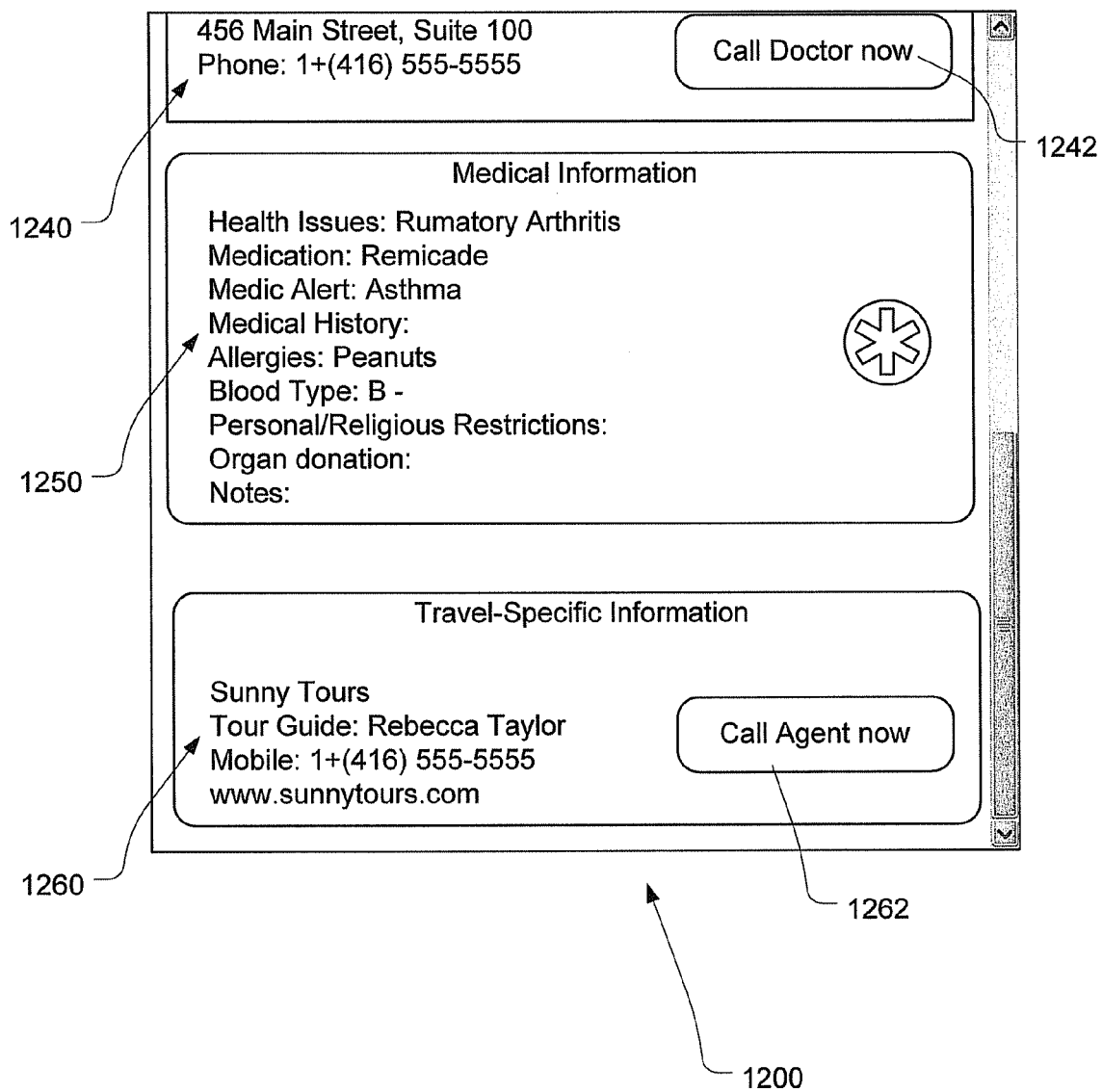
FIG. 13 schematically depicts, by way of example, the emergency information screen of FIG. 12 after scrolling down to reveal additional emergency information including medical information and travel-specific information.

As depicted in FIG. 13, medical information 1250 can be presented. This medical information can present important information about allergies, medications that the owner is currently taking, blood type, personal/religious restrictions on blood transfusions, resuscitation, etc. or organ donation preferences, to name but a few. As further depicted in FIG. 13, travel-specific information may also be presented where appropriate. If the owner is not traveling, this section may be suppressed or greyed out.

FIG. 13 schematically depicts, by way of example, the emergency information screen of FIG. 12 after scrolling down to reveal additional emergency information (namely the medical information and the travel-specific information). In other words, in the example presented in FIG. 12 and FIG. 13, the first responder can view all portions of this emergency information by scrolling up and down. Alternatively, the information can be presented by category of information on discrete pages with a main page linked hierarchically to each of the different categories (pages) of information for easy navigation.

In the foregoing example, the first responder is confined to either calling the dad or the sister using the two user interface elements 1222, 1232 displayed onscreen. In another implementation, once the first responder has called or attempted to call the main contact persons listed on the screen, the first responder may wish to send emails, instant messages, PIN messages, or make further telephone calls to other (backup) contacts. This can be accomplished by providing a full menu 1400 of communication options such as the one presented by way of example in FIG. 14. This example menu 1400 provides options for emailing the dad, emailing the sister, sending a PIN message to the dad or to the sister, etc. Furthermore, the device may provide an option to "notify all" or "contact all" by sending a group e-mail or by sending a common text message (e.g. SMS, MMS) to a group of contacts (e.g. the entire roster of ICE contacts). The mode of communication may be selected based on device capability to ensure all contacts are able to receive the emergency message. A general notification e-mail (or other such communication) enables the first responder to efficiently advise all emergency contacts without having to send sequential individual communications.

Figure 14:
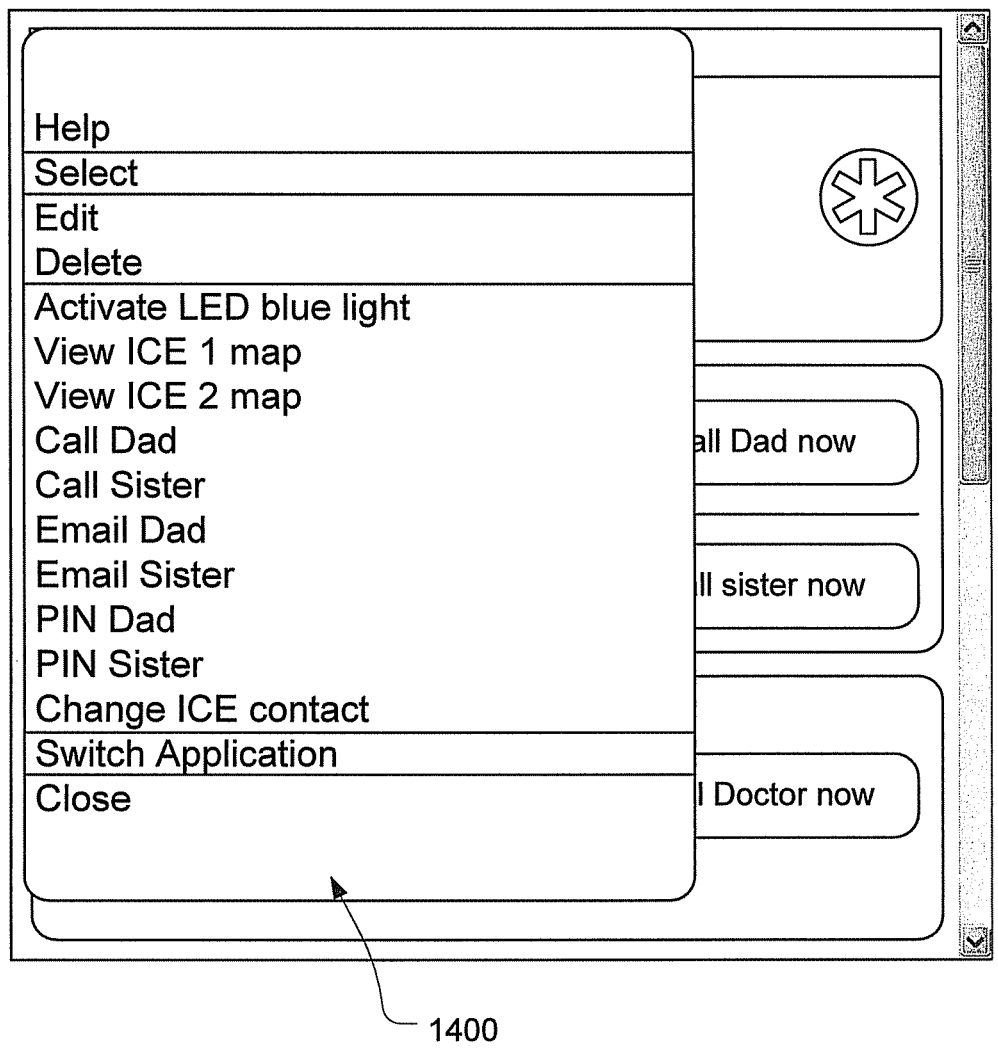
FIG. 14 schematically depicts an exemplary menu of additional commands and options that is superimposed over the emergency information screen of FIG. 12.

The exemplary menu 1400 depicted in FIG. 14 may also be used to enable or disable other functions. For example, this menu can be used to activate a blue LED light on the device which can signify that the owner of the device is in distress. For example, a person having a heart ache or the onset of a stroke may activate the blue light to signify to a first responder that he or she is in distress. Optionally, this blue light activation may also be linked to an automatic 911 call so that a 911 call causes the blue light to activate and activation of the blue light triggers a 911 call. The blue light can also be used by a first responder who has to temporarily leave the scene to signify that the temporarily abandoned owner is in distress and requires immediate medical assistance.

Figure 15:
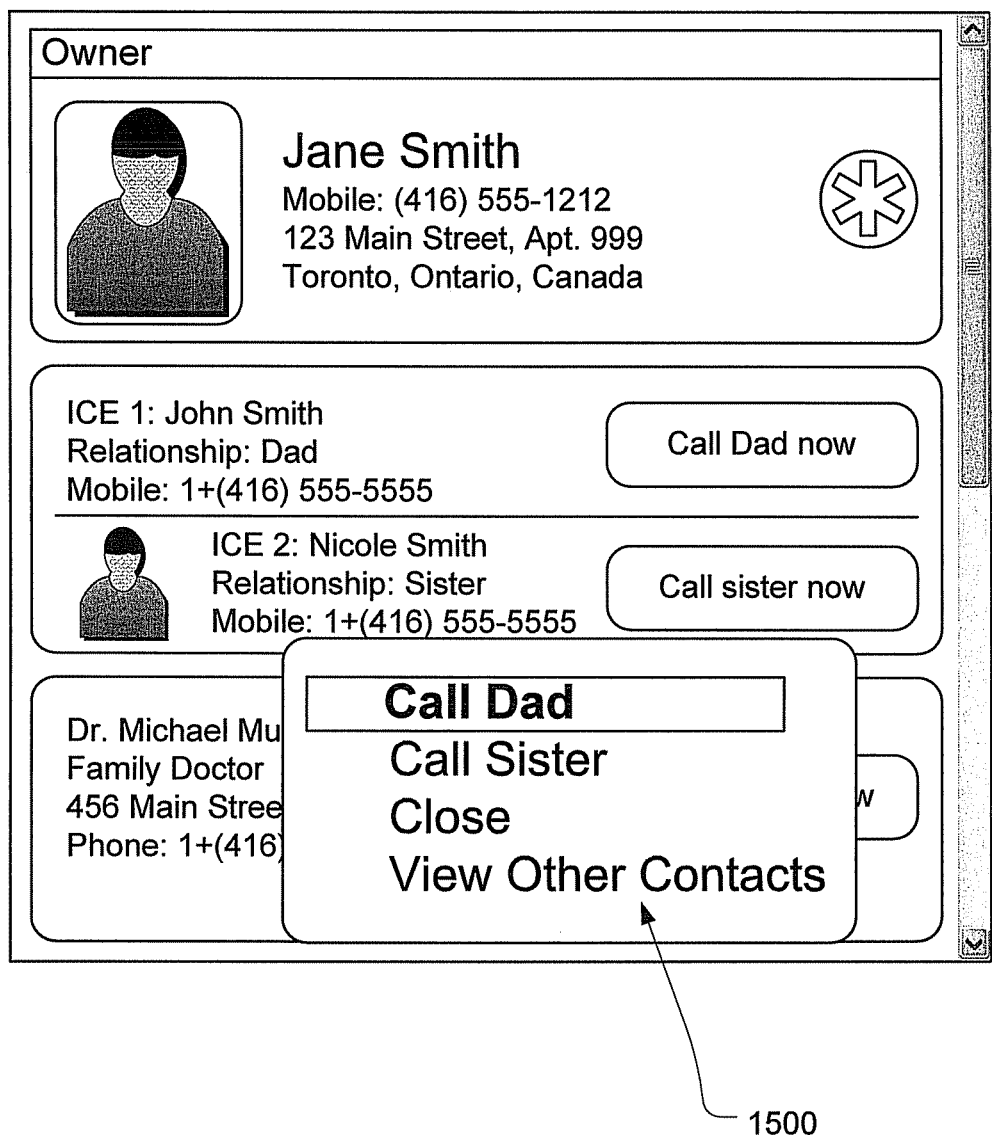
FIG. 15 schematically depicts an example of a call selection menu that can be superimposed over the emergency information screen of FIG. 12.

FIG. 15 schematically depicts an example of a call selection menu 1500 that can be superimposed over the emergency information screen of FIG. 12. This call selection menu 1500 enables the first responder to call either of the contacts, to close the screen or to view (for the purposes of possibly contacting) other emergency contacts. Thus, in one implementation, there could be a plurality of emergency contacts (e.g. 5-10) who are continually dynamically re-prioritized depending on location, time of day and stated availability. If the main contact is unresponsive, then the first responder can try the alternate contact. Even if only two emergency contacts are presented onscreen, as is the case in the present example, the first responder can optionally obtain further alternate contacts using this menu 1500. In a variant, the device can intelligently and dynamically update the contacts if the telephone call goes unanswered. If the call is unanswered, the device can then automatically select the next alternate contact from the list of emergency contacts, again based on the whatever filters are in place, e.g. location-based filters, time-based filters or availability-based filters. In any event, the device can automatically push this information to the ICE application when an emergency phone call goes unanswered. The first responder merely has to select the speed dial button for the next alternate contact. If the next alternate contact does not respond, the device keeps going down the list of alternate contacts until one does respond (or until the list is exhausted, in which case the device can optionally cycle back to the top of the list so that the first responder can then retry the main contact, the first alternate contact, etc.)

From the foregoing, it should be apparent that this novel method and novel device provide unparalleled assistance to a first responder in the case of an emergency involving the owner of the device. By providing multiple emergency contacts, the first responder has a much better chance of reaching a next of kin or an emergency contact. By furthermore prioritizing these contacts dynamically, the contact selected is more likely to be available, responsive and proximal to the site of the distressed owner. By providing a fully panoply of personal, medical and travel-specific information, the first responder is given a complete picture about the owner, pre-existing medical conditions, medications currently being taken, and other relevant information that can literally make the difference between life and death.

The method steps disclosed in the present specification can be implemented as coded instructions in a computer program product. In other words, the computer program product is a computer-readable medium upon which software code is recorded to perform the foregoing steps when the computer program product is loaded into memory and executed on the microprocessor of the wireless communications device.

While the ICE information is stored in the memory of the device, the emergency information can also be backed up wirelessly and automatically by periodically transmitting updated information from the device to a server, e.g. to an enterprise relay server. Furthermore, in another implementation, the emergency information can be stored at a web server to enable emergency contacts to access that information using a web browser. For example, the device could send a link to the website which the emergency contact person accesses (e.g. using a pre-arranged password) in order to obtain all the needed emergency information about the owner of the device. Updates about the device owner's current location, current status, etc. can be pushed to the web server rather than disseminated to each emergency contact.

This new technology has been described in terms of specific implementations and configurations which are intended to be exemplary only. The scope of the exclusive right sought by the Applicant is therefore intended to be limited solely by the appended claims.

The invention claimed is:

1. A method of presenting emergency information on a display of a wireless communications device, the method comprising:
   determining a current location of the device;
   prioritizing a plurality of user-defined emergency contact persons to define prioritized emergency contact persons based on proximity to the current location of the device and availability of the emergency contact;
   displaying contact information for at least two of the prioritized emergency contact persons on an emergency information screen; and
   providing at least one interface element on the emergency information screen to initiate communication with at least one of the prioritized emergency contact persons whose contact information is displayed on the display of the wireless communications device.

2. The method as claimed in claim 1 further comprising displaying owner information comprising personal information about an owner of the device.

3. The method as claimed in claim 1 further comprising displaying medical information about an owner of the device.

4. The method as claimed in claim 1 wherein the displaying of contact information comprises displaying next-of-kin information prioritized in terms of proximity to the current location of the device.

5. The method as claimed in claim 1 further comprising displaying travel-specific information, wherein the travel-specific information is dynamically updated by the device based on the current location of the device.

6. The method as claimed in claim 1 further comprising:
   translating at least some of the emergency information into a language appropriate for the current location of the device.

7. The method as claimed in claim 1 wherein the emergency information is In Case of Emergency (ICE) information.

8. A computer readable medium comprising code which when loaded into memory and executed on a processor of a wireless communications device is adapted to cause the device to perform acts of:
   determining a current location of the device;
   prioritizing a plurality of user-defined emergency contact persons to define prioritized emergency contact persons based on proximity to the current location of the device and availability of the emergency contact;
   displaying contact information for at least two of the prioritized emergency contact persons on an emergency information screen; and
   providing at least one interface element on the emergency information screen to initiate communication with at least one of the prioritized emergency contact persons whose contact information is displayed on the display of the wireless communications device.

9. The computer readable medium as claimed in claim 8 wherein the code is further adapted to cause the device to display owner information comprising personal information about an owner of the device; medical information about the owner; and travel-specific information that is dynamically updated by the device based on the current location of the device.

10. A wireless communications device comprising:
    a processor operatively coupled to a memory for receiving and storing emergency information;
    a location-determining subsystem for determining a current location of the device; and
    a display operatively coupled to the memory and processor for displaying an emergency information screen that presents contact information for a plurality of user-defined prioritized emergency contact persons that have been prioritized based on proximity to the current location of the device and availability of the emergency contact, and wherein the display provides a user input element on the emergency information screen to initiate communication with at least one of the prioritized emergency contact persons.

11. The device as claimed in claim 10 wherein the emergency information comprises one or more of: owner information comprising personal information about an owner of the device; medical information about the owner; and travel-specific information that is dynamically updated by the device based on the current location of the device.

12. The device as claimed in claim 11 wherein the medical information comprises contact information for one or more of a doctor, a medical professional, a clinic and a hospital as well one or more interface elements for initiating communication with one or more of the doctor, the medical professional, the clinic and the hospital.

13. The device as claimed in claim 11 wherein the travel-specific information comprises contact information for a contact person to be called when a user of the device is traveling and an interface element for initiating a communication with the contact person.

14. The device as claimed in claim 10 wherein the display presents a universally recognizable symbol to indicate that the device contains emergency information relevant to the owner of the device.

15. The device as claimed in claim 14 wherein the symbol is a user-selectable icon that provides unrestricted access to the emergency information from a main screen displayed on the device, wherein the main screen comprises a password prompt for gaining access to all other functions of the device.

16. The device as claimed in claim 10 wherein the emergency contact persons are dynamically re-prioritized based on the availability as determined by consulting a calendar for each contact person.

17. The device as claimed in claim 10 wherein the emergency information is In Case of Emergency (ICE) information.

* * * * *

UNITED STATES PATENT AND TRADEMARK OFFICE
CERTIFICATE OF CORRECTION

PATENT NO. : 8,521,122 B2  
APPLICATION NO. : 12/361084  
DATED : August 27, 2013  
INVENTOR(S) : Scott et al.

Page 1 of 1

It is certified that error appears in the above-identified patent and that said Letters Patent is hereby corrected as shown below:

In the Specification

Column 1, line 31, "device may store be used to identify" should read --device may be used to identify--.

Column 1, line 34, "prior the entry." should read --prior to entry.--.

Column 5, line 52, "a user interface elements" should read --a user interface element--.

Column 5, lines 53-54, "a user interface elements" should read --a user interface element--.

Column 6, lines 17-18, "(asterisk or 'star of life')" should read --(asterisk or "star of life")--.

Column 6, lines 18-19, "(asterisk or 'start of life')" should read --(asterisk or "star of life")--.

Column 6, line 20, "the 'star of life'," should read --the "star of life,"--.

Column 6, lines 27-28, "three "*" (asterisks) or 'star of life' presses also opens" should read --three "*" (asterisks) or "star of life" presses also open--.

Column 9, line 8, "person distress." should read --person in distress.--.

Column 9, line 15, "in FIG. 12, The emergency" should read --in FIG. 12, the emergency--.

Column 11, line 22, "a fully panoply" should read --a full panoply--.

In the Claims

Column 13, claim 12, lines 5-6, "as well one or more" should read --as well as one or more--.

Signed and Sealed this  
Tenth Day of December, 2013

Margaret A. Focarino  
*Commissioner for Patents of the United States Patent and Trademark Office*